Patented June 13, 1939

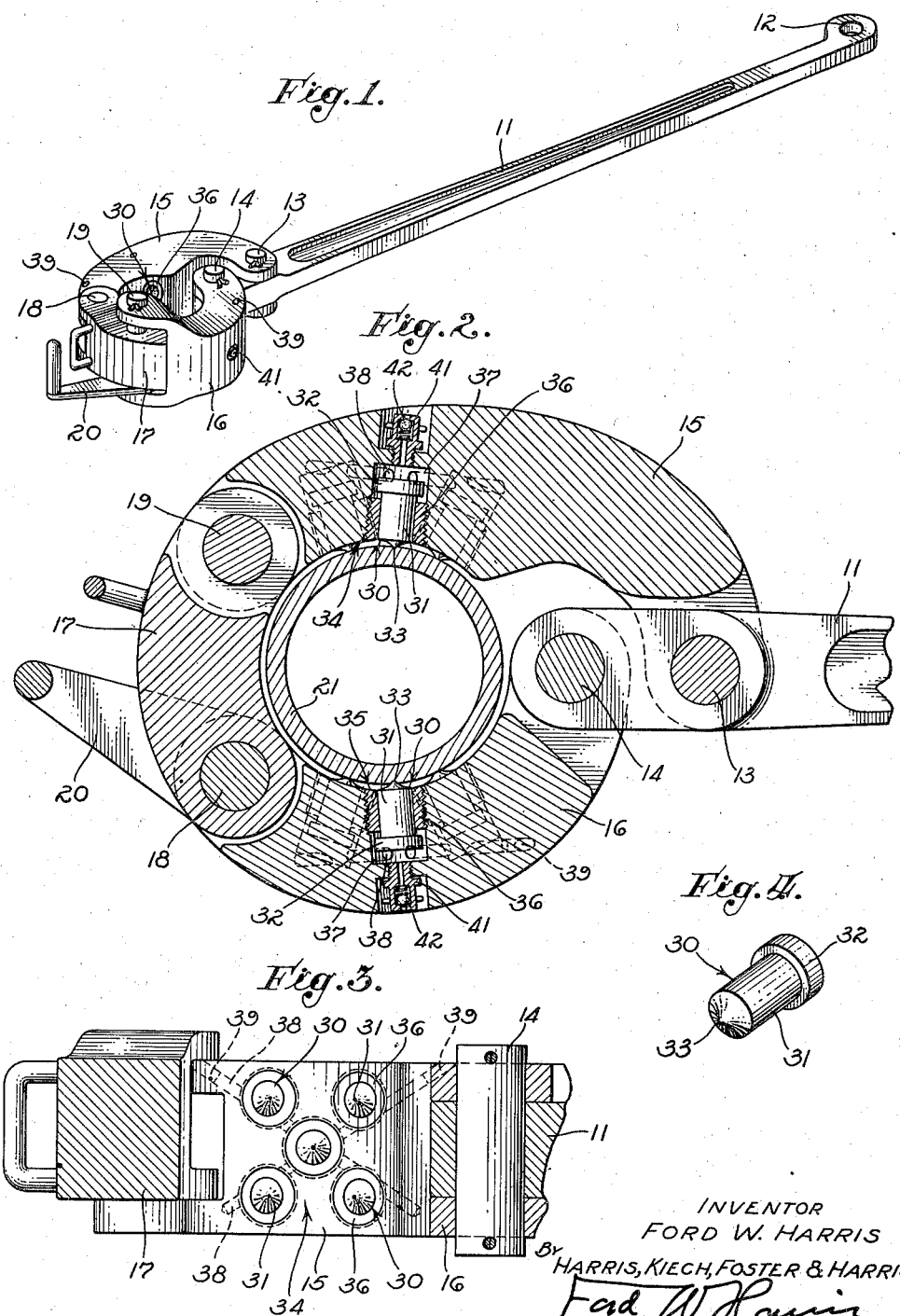

2,162,216

UNITED STATES PATENT OFFICE 2,162,216

PIPE TONGS

Ford W. Harris, Los Angeles, Calif., assignor to Patco, Inc., Los Angeles, Calif., a corporation of California Application November 26, 1938, Serial No. 242,498

2 Claims. (Cl. 81—186)

My invention relates to pipe tongs and is illustrated in the accompanying drawing, in which:

Fig. 1 is a perspective view of a set of such tongs;

Fig. 2 is a horizontal section;

Fig. 3 is a vertical section; and

Fig. 4 is a perspective view of a calk.

The invention may be applied to almost all of the existing forms of pipe tongs, that shown being selected merely for illustrative purposes.

In the form of tongs shown, 11 is a handle having an eye 12 at one end and engaging pins 13 and 14 near the other end. The pin 13 is journalled in a link 15 and the pin 14 is journalled in a link 16. The links 15 and 16 are connected by a link 17 which is engaged by and engages pins 18 and 19. The link 17 may be engaged or disengaged by a handle 20.

The form of tongs shown is a three-link structure. The number of links is unimportant and the method of connecting and disconnecting the link 17 is unimportant. The tongs shown are constricted about a pipe 21 when the handle 11 is rotated in a clockwise direction about the pin 13, as will be readily understood by any person skilled in the art of making or using such tongs. Since these are many forms of such tongs in common use and my invention may be applied to nearly all of them, I consider it unnecessary to go into further details in relation thereto. All that is necessary is that there shall be a plurality of links which are constricted about or forced inwardly toward the pipe 21 by a movement of the handle 11. Such tongs form no part of my invention, being well known in the art.

My invention resides solely in the calks used and the method of actuating them. These calks 30 may vary in form, but that shown in Fig. 4 is a useful form. This form comprises a cylindrical body 31 having a head 32 and a hardened point 33. In the assembly illustrated I use two sets 34 and 35 of such calks and each set is made up of five calks, as shown in Fig. 3.

Each of these calks is mounted in a sleeve 36, as shown in Fig. 2. Each of these sleeves is threaded in a cylindrical cavity 37 in the body of one of the links of the tongs and the calk 30 fits closely in the bore of the sleeve and is free to slide therein. The bottoms of all five cavities 37 of each set 34 and 35 of calks 30 are all connected together by drilled holes 38 which are plugged as shown at 39 so that all these cavities 37 are connected to form a common enclosed cavity or space.

A standard high pressure grease gun fitting 41 is provided for each set 34 and 35 of calks 30, being so placed that grease may be forced therethrough into the common enclosed cavity or space. This grease is retained in the cavity by a ball valve 42 which forms a part of the fitting 41.

In assembling the device before the fitting 41 is screwed in place each of the cavities 37 is filled with heavy grease before the sleeves 36 carrying the calks 30 are screwed into place. As each of the sleeves 36 is screwed into place the heavy grease is forced out through the opening designed to take the fitting 41. The purpose of this procedure is to insure that when the sleeves 36 are all in place and the common cavity formed by the cavities 37 and their connecting holes will be substantially full of grease and contain only a little entrained air. If then the fitting 41 is screwed in place this body of grease is entrapped and held in the common cavity.

The body of grease acts as an equalizing means to insure that each of the five calks of each set 34 and 35 presses with equal force on the pipe when the tongs are constricted. Heavy grease seems to work very well but any liquid might be used, the term "liquid" being used in the claims to denote any non-compressible fluid.

The liquid may also be used to increase or decrease the effective diameter of the tongs to make them fit various small changes in the diameter of the pipe 21. The effective diameter may be decreased by pumping a little more grease into the common cavity using a standard grease gun attached to the fitting 41. The diameter can be increased by putting the tongs in position and applying force through the eye 12, the ball of the valve 42 being unseated by using a toothpick, thus allowing grease to escape from the common cavity.

In practice some small leakage of grease around the calks 30 inside the sleeves 36 may be expected and this leakage is replaced by using the grease gun.

The calks 30 may be of quite different form from those shown. I have found, however, that the sharp conical points are quite efficient, since under the high pressures used they penetrate the metal of the pipe 21 and produce a grip that will not slip. Since each of the calks has the same pressure on it, due to the equalizing action of the grease, each of them penetrates about the same distance and all of them are at all times equally effective.

Since the total pressure exerted by each of the sets 34 and 35 is equally divided between five calks, there is no danger of any calk being subjected to excessive pressure which might injure the calk or the pipe.

In practice, I prefer to so adjust the amount of liquid in the common cavity that the calks 30, when the tong is under full tension, are in about the position shown in Fig. 2. When this tension is then released the pressure on the grease is also released, the grease being under substantially no pressure when the tongs are not in use.

I claim as my invention:

1. In a pipe tongs or the like having members adapted to surround a pipe or other cylindrical metal object to be gripped, the combination of: a plurality of calks having sharp points; means for so mounting said calks in said members that they are free to move radially with relation to said cylindrical metal object in said members; means for equalizing the pressure on two or more of said calks so that they are pressed against the object with equal pressure; and means for constricting said members with sufficient force to drive said points into the substance of said object.

2. In a pipe tongs or the like having members adapted to surround a pipe or other cylindrical metal object to be gripped, the combination of: a plurality of calks having sharp points; means for so mounting said calks in said members that they are free to move radially with relation to said cylindrical metal object in said members; means for so mounting said calks that they are forced inwardly with equal pressure by a confined body of liquid which acts equally on two or more of said calks; and means for constricting said members with sufficient force to drive said points into the substance of said object.

FORD W. HARRIS.